United States Patent
Watanabe

[11] Patent Number: 6,044,823
[45] Date of Patent: Apr. 4, 2000

[54] FUEL INJECTOR CONTROL SYSTEM FOR CYLINDER INJECTION TYPE INTERNAL COMBUSTION ENGINE

[75] Inventor: Tetsushi Watanabe, Tokyo, Japan

[73] Assignee: Mitsubishi Denki Kabushiki Kaisha, Tokyo, Japan

[21] Appl. No.: 08/984,995

[22] Filed: Dec. 4, 1997

[30] Foreign Application Priority Data

May 22, 1997 [JP] Japan ................................. 9-132415

[51] Int. Cl.<sup>7</sup> .................................................. F02M 51/00
[52] U.S. Cl. ........................................ 123/490; 361/154
[58] Field of Search .............................. 123/490; 361/154

[56] References Cited

U.S. PATENT DOCUMENTS

| | | | |
|---|---|---|---|
| 3,702,601 | 11/1972 | Gordon et al. | 123/490 |
| 3,727,592 | 4/1973 | Wilkinson | 123/490 |
| 3,854,458 | 12/1974 | Reddy | 123/490 |
| 3,855,973 | 12/1974 | Scofield | 123/490 |
| 4,372,273 | 2/1983 | Harper | 1123/490 |
| 4,479,161 | 10/1984 | Henrich et al. | 123/490 |
| 4,688,536 | 8/1987 | Mitsuyasu et al. | 123/490 |
| 4,770,178 | 9/1988 | Sausner et al. | 123/490 |
| 4,885,658 | 12/1989 | Buchl | 123/490 |
| 4,905,120 | 2/1990 | Grembowicz et al. | 123/490 |

FOREIGN PATENT DOCUMENTS 63-34387 2/1988 Japan.

*Primary Examiner*—Erick R. Solis
*Attorney, Agent, or Firm*—Sughrue, Mion, Zinn, Macpeak & Seas, PLLC

[57] ABSTRACT

An inexpensive and small-scale fuel injector control system having a number of fuel injector driving circuits smaller than the corresponding number of driven fuel injectors, in a cylinder injection type internal combustion engine having cylinders that are distanced by two strokes with respect to fuel injection timing and where no overlap occurs in the fuel injection timing. One of the ends of each of the coils of plural injectors, for the cylinders that are distanced from each other by two strokes in the fuel injection timing without overlapping each other, are simultaneously connected to an output terminal of a driving circuit, while the other ends of the coils are connected, respectively, to switching means that are turned on or off at energization/deenergization timings of coils of the fuel injectors.

3 Claims, 2 Drawing Sheets

FUEL INJECTOR CONTROL SYSTEM FOR CYLINDER INJECTION TYPE INTERNAL COMBUSTION ENGINE

BACKGROUND OF THE INVENTION

1. Field of the Invention

The present invention relates to a fuel injector control system for an cylinder injection type internal combustion engine for controlling fuel injectors provided for supplying fuel to individual engine cylinders.

2. Description of Related Art

Generally, in a conventional sequential type multi-point fuel injection control system for an internal combustion engine of a cylinder injection (direct fuel injection) type known heretofore, a variety of information concerning the engine operating state is obtained with the aid of various sensors provided peripherally in association with the engine, wherein fuel injectors provided independently for the individual cylinders, respectively, of the internal combustion engine are electrically and electronically controlled on the basis of the above-mentioned information so that each of the fuel injectors is opened and closed at predetermined timings for predetermined time periods by means of an associated one of injector driving circuits that are provided separately and independently on a cylinder-by-cylinder basis.

In the conventional fuel injector control system, not only for the cylinder injection type gasoline engine but also for the Diesel engine, the injector driving circuit is provided for each of the fuel injectors mounted on the individual engine cylinders, respectively, as typified by the sequential type multi-point fuel injector control system mentioned above.

In a typical one of the fuel injector control systems such as disclosed in Japanese Patent Publication No. 26701/1995 as a sixth embodiment shown in FIG. 7 of the drawings accompanying the specification of the above application, one of the ends of all the injector coils $V_1$ to $V_N$ are connected in common to a high-voltage generating unit 10 and a constant current circuit unit 30, while the other ends of the injector coils $V_1$ to $V_N$ are connected to current supply control transistors $\tau_1$ to $\tau_3$ provided for the individual engine cylinders, respectively, for controlling individually the injector coils $V_1$ to $V_N$ independently from one another.

In the conventional fuel injector control system known heretofore, a driving circuit is provided for each of the individual fuel injectors independent of one another in order to cope with such possibility that the electric control of the individual fuel injectors may be performed abnormally due to overlap of the driving period between the plural fuel injectors. Consequently, the conventional fuel injector control system suffers a problem that the fuel injector control system becomes expensive and complicated because of need for providing the driving circuit for each of the fuel injectors provided for the engine cylinders, respectively.

SUMMARY OF THE INVENTION

In the light of the state of the art described above, it is an object of the present invention to provide a fuel injector control system for a cylinder injection type internal combustion engine which can be implemented inexpensively and on a small scale, with the number of the fuel injector driving circuits and the number of corresponding circuit elements thereof being significantly decreased, while preventing overlapping of the fuel injection timing or period between the engine cylinders that are located adjacent to each other with regard to the fuel injector driving timing.

In view of the above and other objects which will become apparent as the description proceeds, there is provided according to a general aspect of the present invention a multi-point type fuel injector control system for a cylinder injection type internal combustion engine, in which a fuel quantity to be supplied to individual cylinders of the internal combustion engine as well as fuel injection timings therefor are arithmetically determined in dependence on the operating state of the internal combustion engine, so that fuel is supplied to the internal combustion engine in accordance with the result of the arithmetic operation through a plurality of fuel injectors provided in correspondence to the engine cylinders, respectively. The above-mentioned system includes an injector drive/control means that is provided in common to the fuel injectors for those of the cylinders that are distanced from each other by two strokes in a fuel injection sequence in which no overlap occurs in respect to fuel injection timing between the cylinders, for generating a first driving signal for controlling driving operation of a fuel injector in conformance with the relevant fuel injection timing.

By virtue of the structure of the fuel injector control system described above, the number of parts in the injector drive/control means can be significantly decreased when compared with the conventional fuel injector control system known heretofore, so that the fuel injector control system according to the invention can be implemented in a simplified structure at low cost, to a great advantage.

In a preferred mode for carrying out the invention, the fuel injector drive/control means may be so designed as to include a signal generating unit for generating a select signal for selecting the fuel injector and the first driving signal therefor in conformance with the result of the arithmetic operation of the fuel quantity and the fuel injection timing, and a driving signal output unit for outputting the first driving signal to the fuel injector selected by the select signal.

With the arrangement described above, there can be realized a fuel injector control system that can ensure a high degree of freedom in the fuel injection control because the fuel injection control range can be extended significantly.

In another preferred mode for carrying out the invention, the driving signal output unit may include an operation holding unit for supplying for a predetermined time period a second driving signal of a lower voltage level than that of the first driving signal to the selected fuel injector in succession which the first driving signal to thereby hold the selected fuel injector in an operating state for a predetermined time period.

With the arrangement of the fuel injector control system described above, the electric power for holding the fuel injector in the opened state can be lowered, whereby the power consumption of the fuel injector control system as a whole can be remarkably reduced when compared with the conventional fuel injector control system.

In a further preferred mode for carrying out the invention, the fuel injector control system may further include a high-speed interrupting unit for interrupting at a high speed the second driving signal applied to the fuel injector.

With the arrangement of the fuel injector control system mentioned above, there can be obtained a further advantage that fuel injection can be controlled with further enhanced accuracy.

BRIEF DESCRIPTION OF THE DRAWINGS

In the course of the description which follows, reference is made to the drawings, in which.

DESCRIPTION OF THE PREFERRED EMBODIMENTS

Figure 1:
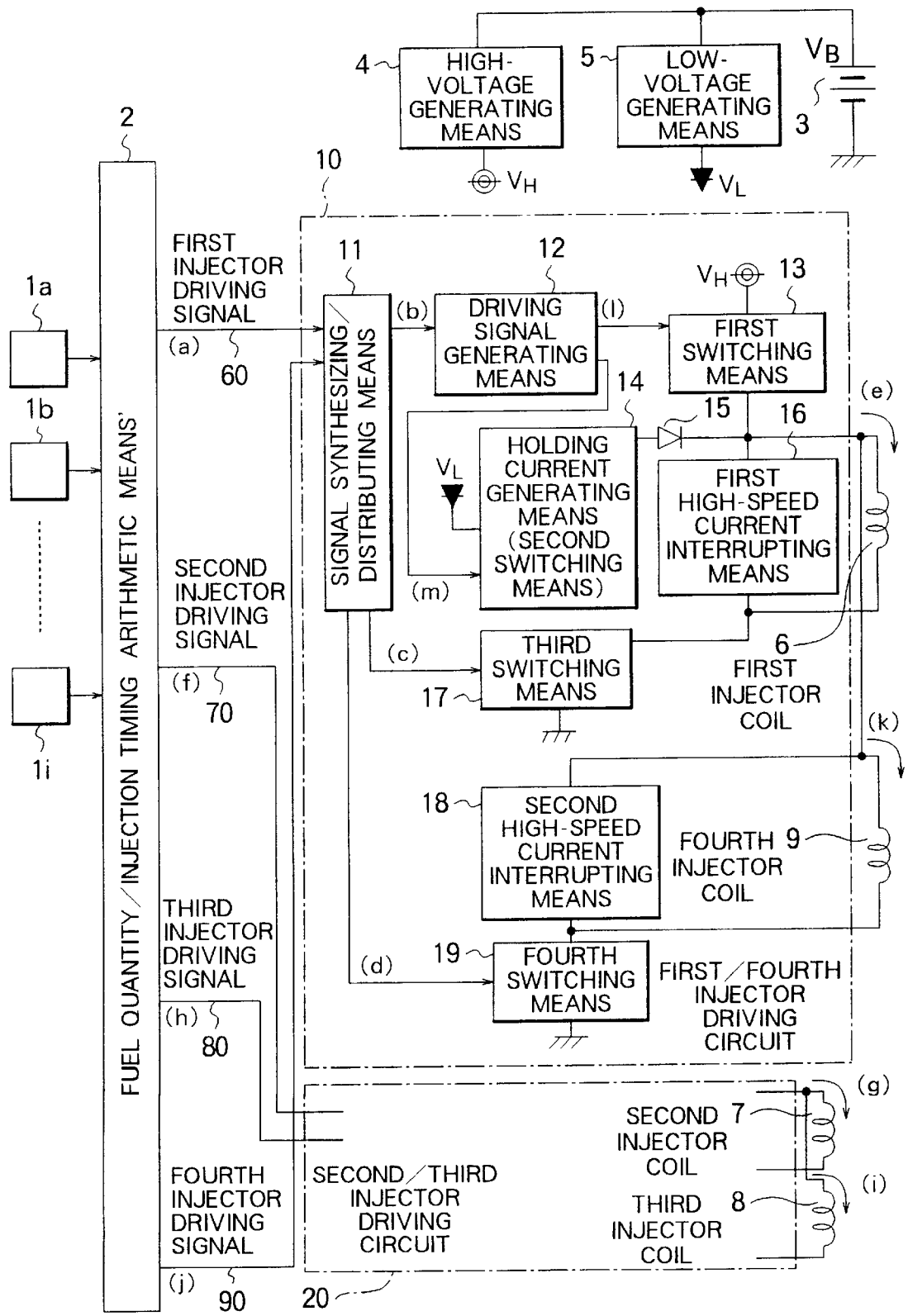
FIG. 1 is a schematic diagram showing a general arrangement of a fuel injector control system for a cylinder injection type internal combustion engine according to an exemplary embodiment of the present invention.

Now, the present invention will be described in detail in conjunction with what is presently considered as preferred or typical embodiments thereof by reference to the drawings. In the following description, like reference characters designate like or corresponding parts throughout the several views.

The following description will be made on the assumption that the fuel injector control system according to the invention is applied to a four-cycle internal combustion engine having four cylinders, i.e., first, second, third and fourth cylinders. However, this is only by way of example. It goes without saying that the invention is not restricted to any specific number of cylinders.

FIG. 1 is a schematic diagram showing a general arrangement of a fuel injector control system according to an exemplary embodiment of the present invention. In the fuel injector control system according to the instant embodiment a first/fourth injector driving circuit 10 is provided in common to the fuel injectors provided for the first and fourth cylinders that do not simultaneously assume the fuel injection mode, while a similar second/third injector driving circuit is provided in common to the second and third cylinders which can not simultaneously assume the fuel injection mode either, whereby the number of the injector driving circuits is decreased when compared with that of the engine cylinders. In the case of the fuel injector control system now under consideration, the number of the injector driving circuits (10, 20) is equal to a half of the cylinder number. More specifically, it should be recalled that in the conventional fuel injector control system, the fuel injector is provided in one-to-one correspondence to the cylinder. By way of example, in the conventional cylinder injection type internal combustion engine having four cylinders, there are provided four injector driving circuits separately and individually for the four cylinders, respectively. By contrast, in the fuel injector control system according to the instant embodiment of the invention, only a pair of injector driving circuits (first/fourth and second/third injector driving circuits) are provided for the four cylinders on a two-by-two cylinder basis, so to say.

Referring to FIG. 1, reference numerals 1a, 1b, ... 1i denote sensors for detecting information concerning the engine operating state. As such sensors, there may be mentioned a crank angle sensor, a cam angle sensor, a throttle position sensor and others. Numeral 2 denotes a fuel quantity/injection timing arithmetic means for arithmetically determining the fuel injection timing as well as the amount or quantity of fuel to be injected to the engine, and numeral 3 denotes a battery which constitutes an exciting current supply source for electrically energizing electromagnetic coils of the fuel injectors, as will be described hereinafter.

Further, reference numeral 4 denotes a high-voltage generating means for generating a voltage $V_H$ higher than the battery voltage $V_B$ by boosting up the battery voltage $V_B$, numeral 5 denotes a low-voltage generating means for generating a constant voltage $V_L$ lower than the battery voltage $V_B$ by stepping down the battery voltage $V_B$, numeral 6 denotes a coil of the fuel injector for the first engine cylinder (hereinafter referred to as the first injector coil), numeral 7 denotes a coil of the fuel injector for the second cylinder (hereinafter referred to as the second injector coil), numeral 8 denotes a coil of the fuel injector for the third cylinder (hereinafter referred to as the third injector coil), and numeral 9 denotes a coil of the fuel injector for the fourth cylinder (hereinafter referred to as the fourth injector coil).

Further, reference numerals 60, 70, 80 and 90 designate first to fourth injector driving signals, respectively, which are outputted from the fuel quantity/injection timing arithmetic means 2. The first/fourth injector driving circuit 10 is adapted for driving selectively the first and fourth fuel injectors in accordance with the first and fourth injector driving signals 60 and 90. On the other hand, the second/third injector driving circuit 20 is designed for driving selectively the second and third fuel injectors in accordance with the aforementioned second and third injector driving signals 70 and 80.

The first/fourth injector driving circuit 10 is comprised of the components mentioned below:

a signal synthesizing/distributing means 11 for synthesizing the first injector driving signal 60 and the fourth injector driving signal 90 to thereby generate an injector driving signal (b) and additionally output distributively a first select signal (c) or a fourth select signal (d) in dependence on the first injector driving signal 60 or the fourth injector driving signal 90 as inputted, a driving signal generating means 12 which responds to the injector driving signal (b) outputted from the signal synthesizing/distributing means 11 for thereby generating a driving signal (l) for driving the fuel injector for the first cylinder or for the fourth cylinder, a first switching means 13 inserted in a power supply path extending from the high-voltage generating means 4 to the first injector coil 6 and the fourth injector coil 9 for thereby turning on or off exciting currents (e) and (k) for the first and fourth injector coils 6 and 9 and the high-voltage generating means 4 in response to the driving signal (l) outputted from the driving signal generating means 12, a holding current generating means 14 which responds to the output voltage $V_L$ of the low-voltage generating means 5 and the injector driving signal (b) outputted from the signal synthesizing/distributing means 11 to thereby supply a hold signal (m) to the first injector coil 6 and the fourth injector coil 9 for holding the fuel injectors in the opened state, wherein the holding current generating means 14 is usually in the non-conducting state (off-state) and is turned on (i.e., switched to the conducting state) when the fuel injectors are held in the opened state (this function may thus be referred to as the second switching function or means), a reverse blocking diode 15 connected between the output of the holding current generating means 14 and a junction between the injector coils 6 and 9 for preventing the output current of the high-voltage generating means 4 from flowing reversely to the output side of the holding current generating means 14 when the first switching means 13 is turned on, a first high-speed current interrupting means 16 connected across the first injector coil 6 for breaking the current at a high speed for deenergization of the first injector coil 6, a third switching means 17 inserted between the other end of the first injector coil 6 and ground and turned on or off in response to the first select signal (c) generated by the signal synthesizing/distributing means 11 on the basis of the first injector driving signal 60, a second high-speed current interrupting means 18 connected across the fourth injector coil 9 for breaking or interrupting the current at a high speed for deenergization of the fourth injector coil 9, and a fourth switching means 19 connected between the other end of the fourth injector coil 9 and ground and turned on or off in response to the fourth select signal (d) generated by the signal synthesizing/distributing means 11 on the basis of the fourth injector driving signal 90.

Because the output terminal of the first switching means 13 is connected to the common junction at the one end of the first injector coil 6 and the one end of the fourth injector coil 9 and because the output of the holding current generating means 14 is also coupled to the above common junction via the reverse blocking diode 15, the driving circuit for driving both the fuel injectors of the first and fourth cylinders can be realized as a single circuit.

Parenthetically, the first/fourth injector driving circuit 10, the second/third injector driving circuit 20 and the first, third and fourth switching means 13, 17 and 19 cooperate to constitute a fuel injector drive/control means or unit, while the signal synthesizing/distributing means 11 constitutes a signal generating unit with the driving signal generating means 12 constituting a driving signal output unit. Further, the holding current generating means 14 constitutes an operation holding unit, and the first high-speed current interrupting means 16 and the second high-speed current interrupting means 18 cooperate to constitute a high-speed interrupting unit.

Figure 2:
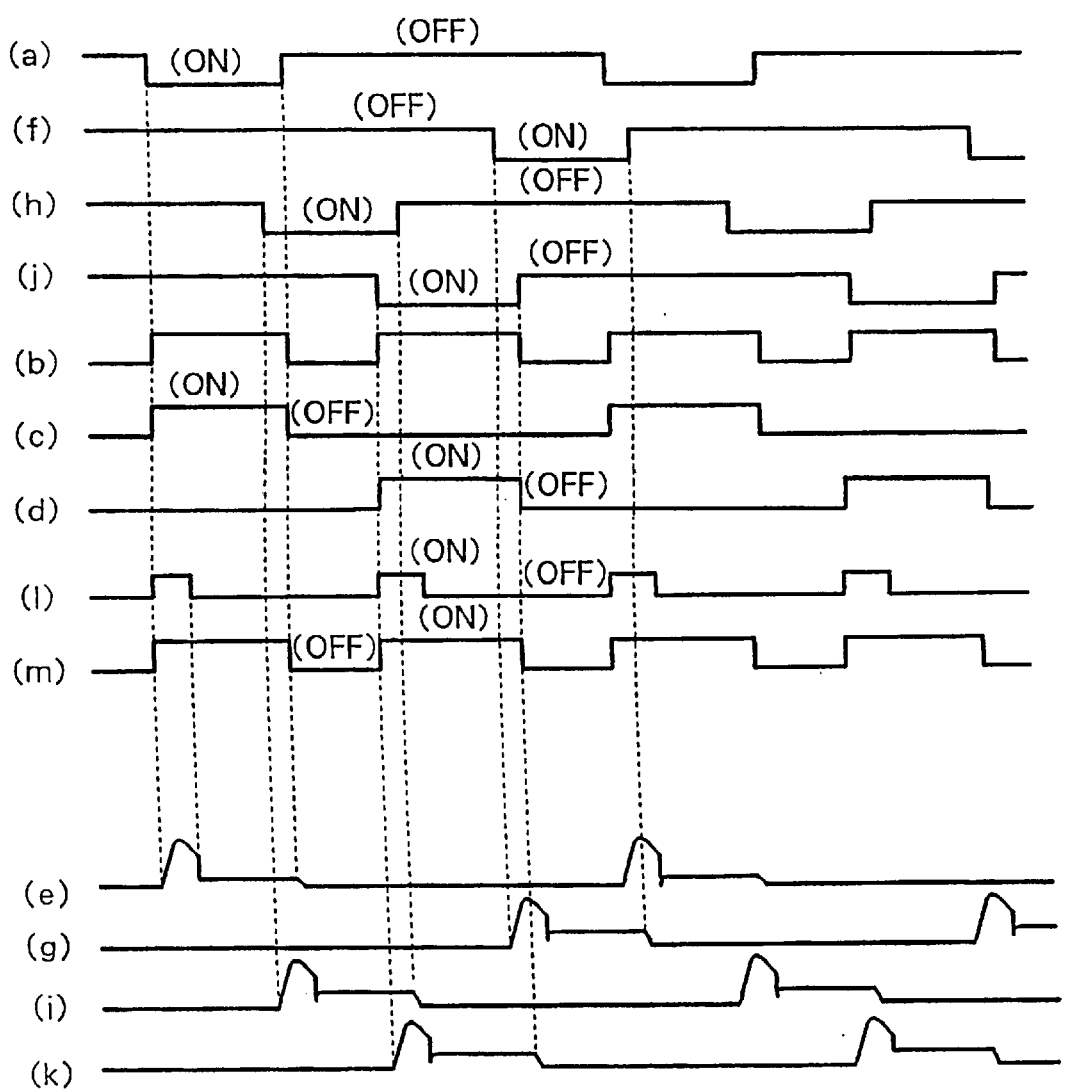
FIG. 2 is a schematic timing/waveform diagram for illustrating operations of the individual means constituting the fuel injector control system according to an embodiment of the invention.

FIG. 2 is a timing/waveform diagram for illustrating operations of the individual means comprising the fuel injector control system according to the instant embodiment of the invention.

In the figure, the first injector driving signal outputted from the fuel quantity/injection timing arithmetic means 2 is illustrated at (a), a second injector driving signal is illustrated at (f), a third injector driving signal is illustrated at (h), a fourth injector driving signal is illustrated at (j), and the injector driving signal is illustrated at (b). As mentioned hereinbefore, the injector driving signal (b) is generated by the signal synthesizing/distributing means 11 on the basis of the first injector driving signal (a) and the fourth injector driving signal (j).

Further referring to FIG. 2, the first select signal which is generated by the signal synthesizing/distributing means 11 on the basis of the first injector driving signal (a) is illustrated at (c), the fourth select signal generated by the signal synthesizing/distributing means 11 on the basis of the fourth injector driving signal is shown at (j), the driving signal generated by the driving signal generating means 12 on the basis of the injector driving signal (b) to be outputted to the first switching means 13 is shown at (l), and a hold signal outputted to the holding current generating means 14 from the driving signal generating means 12 in response to the injector driving signal (b) supplied from the signal synthesizing/distributing means 11 is illustrated at (m).

Furthermore, shown at (e) is an exciting current supplied to the first injector coil 6 through cooperation of the high-voltage generating means 4, the first switching means 13, the third switching means 17, the low-voltage generating means 5, the holding current generating means 14, the reverse blocking diode 15 and the first high-speed current interrupting means 16, while shown at (k) is an exciting current supplied to the fourth injector coil 9 through cooperation of the high-voltage generating means 4, the first switching means 13, the fourth switching means 19, the low-voltage generating means 5, the holding current generating means 14, the reverse blocking diode 15 and the second high-speed current interrupting means 18. Moreover shown at (g) is an exciting current supplied to the second injector coil 7 through cooperation of the second/third injector driving circuit 20 whereas shown at (i) is an exciting current supplied to the third injector coil 8 through operation of the second/third injector driving circuit 20.

Now, the description will be directed to the operation of the fuel injector control system according to the instant embodiment of the invention.

In general, in the four-cycle four-cylinder internal combustion engine, all the strokes of the engine, i.e., suction stroke, compression stroke, explosion stroke and exhaust stroke are executed at every engine rotation angle or crank angle (CA) of 720°, while each of the individual strokes mentioned above is executed at every 180° CA. Further, in the conventional four-cylinder internal combustion engine, the compression stroke is executed sequentially in the order of the first cylinder, the third cylinder, the fourth cylinder, the second cylinder and then the first cylinder.

For the convenience of description, it is defined that the first and fourth cylinders constitute a first cylinder group while the third and second cylinders constitute a second cylinder group. In that case, given that strokes of the cylinders belonging to the same cylinder group are distanced from each other by 360° in terms of the engine rotation angle or crank angle (CA). Consequently, in the internal combustion engine of the cylinder injection type, there will scarcely occur such situation that the cylinders belonging to the same cylinder group assume simultaneously or concurrently the fuel injection mode.

However, in the case of the internal combustion engine in which the adjacent strokes of the cylinders belonging to the first and second cylinder groups, respectively, are distanced from each other by one stroke (or 180° in terms of the crank angle), as in the case where the first cylinder is in the compression stroke with the third cylinder being in the suction stroke, the fuel injection timings for the first and the third cylinders, respectively, may be performed concurrently, i.e., with overlap of the fuel injection timing between the first and third cylinders (or between the second and fourth cylinders).

For the reason mentioned above, in the fuel injector control system according to the instant embodiment of the invention, there is provided the first/fourth injector driving circuit in common for the fuel injectors of the first and fourth cylinders which can not concurrently assume the fuel injection mode while the second/third injector driving circuit is provided in common for the second and third cylinders which can not concurrently assume the fuel injection mode either.

By selectively driving the injectors of the cylinders belonging to the first and second cylinder groups, respectively, at every other stroke by means of the injector driving circuit, the fuel injector control system according to the instant embodiment of the invention can cope with the fuel injection control in the internal combustion engine in which the fuel injection timing overlaps between the cylinder belonging to one cylinder group and the cylinder belonging to the other cylinder group when both the cylinders are in the compression stroke and the suction stroke, respectively.

The injector driving signals generated by the fuel quantity/injection timing arithmetic means 2 for the fuel injectors of the individual engine cylinders are outputted at such timings as illustrated at (a), (f), (h) and (j), respectively, in FIG. 2. Referring to FIG. 1, the first injector driving signal 60 illustrated at (a) and the fourth injector driving signal 90 illustrated at (j) in FIG. 2 are inputted to the signal synthesizing/distributing means 11 serving as the input interface unit for the first/fourth injector driving circuit 10 with an interval corresponding to the period covering two strokes of the engine.

In response to the injector driving signals 60 and 90, the signal synthesizing/distributing means 11 generates the injector driving signal (b) as well as the first select signal (c) for the first cylinder and the fourth select signal (d) for the fourth cylinder, as can be seen from FIG. 2. The third switching means 17 is turned on in response to the first select signal (c), while the fourth switching means 19 is turned on in response to the fourth select signal (d).

When the third switching means 17 is turned on, a current path is formed which extends to ground via the first switching means 13 or 14, the reverse blocking diode 15, the first injector coil 6 and the third switching means 17. Further, when the fourth switching means 19 is turned on, a current path is formed which extends to ground via the fourth injector coil 9 and the fourth switching means 19. As a result, the overexcitation current and the holding current are supplied from the first switching means 13 and the holding current generating means 14, respectively, only to the fuel injector for the engine cylinder for which the corresponding current path mentioned above is formed.

When the injector driving signal (b) is inputted to the driving signal generating means 12 in the state where the current path is formed for either one of the injectors for the first and fourth cylinders, the overexciting current (l) generated by the driving signal generating means 12 is applied to the first switching means 13 connected to the high-voltage generating means 4, whereby the first switching means 13 is turned on.

As a result, the high voltage is supplied to the first injector coil 6 or the fourth injector coil 9 from the high-voltage generating means 4 via the first switching means 13. Consequently, a large current is fed to the first injector coil 6 or the fourth injector coil 9 as an exciting current (e) or (k) from the high-voltage generating means 4 by way of the first switching means 13, whereby the first or fourth fuel injector is caused to open initially at an increased speed at the preset injection timing (or time point).

Furthermore, the hold signal (m) for the fuel injector of the first or fourth cylinder as generated separately by the driving signal generating means 12 substantially simultaneously with the generation of the overexciting current (l) by the driving signal generating means 12, is inputted for a predetermined duration or period to the holding current generating means 14, which is supplied with the output voltage $V_L$ from the low-voltage generating means 5 serving as the power source. As a result of this, the exciting current (e) or (k) is fed to the first injector coil 6 or the fourth injector coil 9 by way of the reverse blocking diode 15 to thereby hold the fuel injector of the first or fourth cylinder in the opened state in succession to the opening operation of the fuel injector in response to the overexciting current (l).

In order to realize the closing operation of the first or fourth cylinder equally at a high speed, interruption or breakage of the current flowing through the first injector coil 6 or the fourth injector coil 9 is carried out by shunting or closing both ends of the first injector coil 6 or the fourth injector coil 9 by means of the first high-speed current interrupting means 16 or the second high-speed current interrupting means 18. As a result of this, the energization current flowing through the first injector coil 6 or the fourth injector coil 9 assumes such a waveform as illustrated at (e) in the case of the first injector coil 6 and at (k) for the fourth injector coil 9.

Similarly, by inputting the second injector driving signal (f) or the fourth injector driving signal (j) for the second injector coil 7 or the third injector coil 8 from the fuel quantity/injection timing arithmetic means 2, the energization current for the coil of the second or third fuel injector is a waveform such as illustrated at (g) for the second injector coil 7 and at (k) for the third injector coil 8.

In the foregoing description, it has been assumed that the teachings of the invention are applied to a sequential type fuel injector control system for a four-cylinder internal combustion engine. However, it goes without saying that the present invention is never restricted to any specific number of the engine cylinders but can equally find application to the fuel injector control system for the internal combustion engine having a different number of cylinders and fuel injectors.

Many modifications and variations of the present invention are possible in the light of the above techniques. It is therefore to be understood that within the scope of the appended claims, the invention may be practiced otherwise than as specifically described.

What is claimed is:

1. A fuel injector controlling apparatus comprising:
   injector driving signal outputting means (2) for outputting, in common, a first injector driving signal (a) and a second injector driving signal (j), said signals (a, j) corresponding to first and second injectors (6), (9) for first and second cylinders, respectively, the first and second cylinder operations being offset by two strokes, said signals (a, j) being distanced so that fuel injection timings do not overlap each other;
   signal synthesizing outputting means (11) for synthesizing the first and second injector driving signals (a), (j) in order to output a first select signal (c) and a second select signal (d), said signals (c, d) being distanced so that fuel injection timings do not overlap each other, said signal synthesizing outputting means outputting an injector driving signal (b);
   driving voltage applying means (12), (13) for applying a driving voltage to said first and second injectors (6), (9) upon receiving said injector driving signal (b); and
   distribution path forming means (17), (19) for forming current distributing paths for said first and second injectors (6), (9) upon receiving said first select signal (c) and second select signal (d), wherein first and second injectors (6), (9) are driven at an interval at which fuel injection timings do not overlap each other.

2. A fuel injector controlling apparatus according to claim 1, wherein the driving voltage applying means (12) comprises an operation holding section (14) for outputting, after the application of a driving voltage, a voltage of a lower voltage level than said driving voltage to the first and second injectors for a predetermined time period in order to hold the operations of the injectors for a predetermined time period.

3. The fuel injector controlling apparatus according to claim 1, further comprising high-speed interrupting sections (16), (18) for individually interrupting at a high speed a current flowing through each of the first and second injectors (6), (9).

* * * * *